Sept. 12, 1967  A. M. BRENNEKE  3,340,774
COMBINATION CYLINDER SLEEVE OR LINER AND
COMBUSTION CHAMBER SEAL
Filed July 13, 1965  3 Sheets-Sheet 1

INVENTOR
ARTHUR M. BRENNEKE
BY
Hofgren, Wegner,
Allen, Stellman & McCord
Attys.

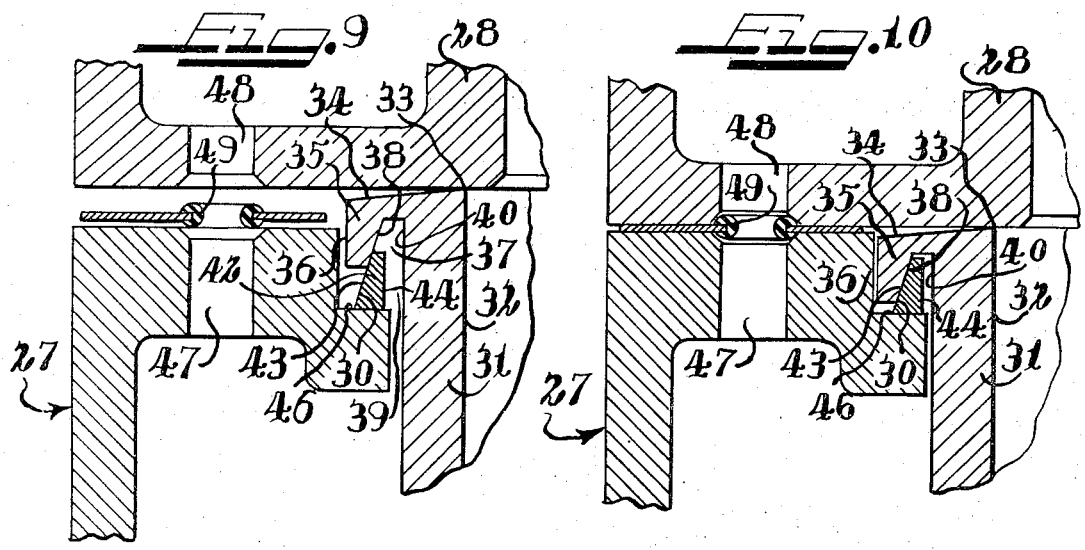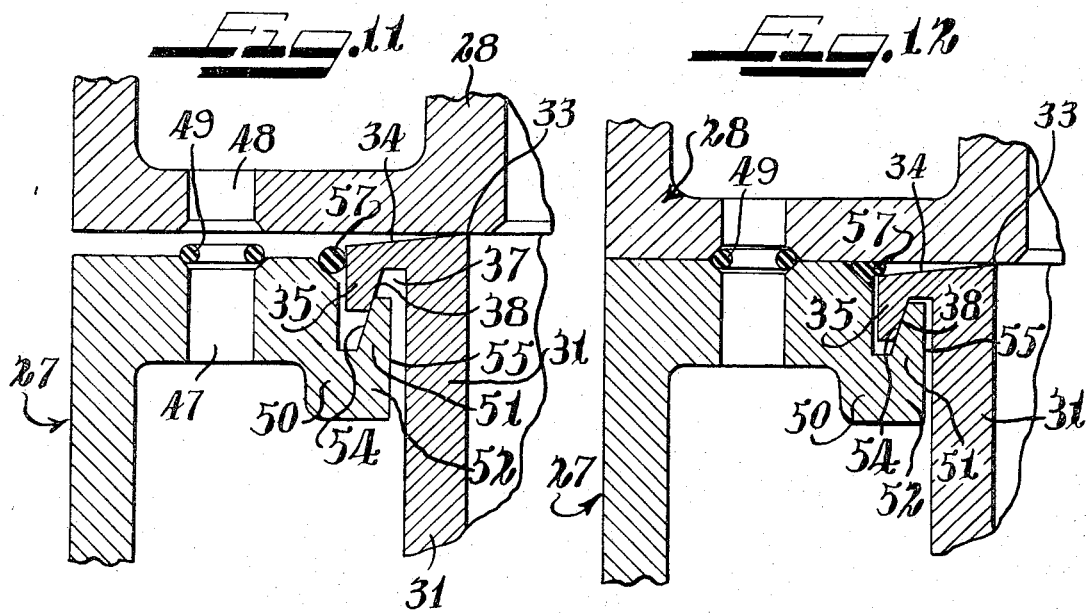

United States Patent Office 3,340,774
Patented Sept. 12, 1967

3,340,774
COMBINATION CYLINDER SLEEVE OR LINER AND COMBUSTION CHAMBER SEAL
Arthur M. Brenneke, 923 Maplewood Drive,
New Castle, Ind. 47362
Filed July 13, 1965, Ser. No. 471,582
6 Claims. (Cl. 92—171)

This invention relates to a cylinder sleeve or liner and combustion chamber seal for internal combustion engines.

It is an object of this invention to provide a new and improved, more permanent and durable combustion chamber seal.

It is a further object of this invention to provide a cylinder liner and combustion chamber seal having a wide range of compressibility with a relatively low axial load requirement and in which gas forces act to increase the sealing pressure.

It is another object of this invention to provide a combustion chamber seal which has the elasticity necessary to follow the relative motion of a combustion chamber head and a cylinder block through heating and cooling periods.

It is yet another object of this invention to provide a combination of a cylinder liner and sealing element which may be in one piece, unitized, or in two separate pieces, thereby satisfying a variety of economic and/or handling and assembly requirements.

More particularly this invention relates to a cylinder sleeve and combustion chamber seal which employs a sealing member in the form of a wedge which translates the axial hold-down force applied to the cylinder head into a force acting on the liner in what approaches a radial direction.

Other objects and advantages of the invention will be apparent from the following description taken in conjunction with the accompanying drawings in which:

FIG. 9 shows a modified form of my invention with the parts not yet under load;

FIG. 10 shows the engine of FIG. 9 wherein the head is torqued down;

FIG. 11 shows a further modified form of my invention with the parts not yet under load; and FIG. 12 shows the engine of FIG. 11 wherein the head is torqued down;

Figure 1:
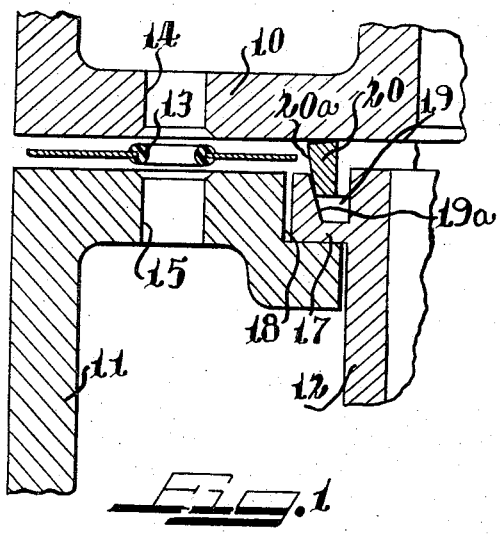
FIG. 1 is a partial sectional view radially through a wet liner type engine embodying one form of the seal of this invention, and shows the engine before the combustion chamber head is torqued down.

While illustrative embodiments of the invention are shown in the drawings and will be described in detail herein, the invention is susceptible of embodiment in many different forms, and it should be understood that the present disclosure is to be considered as an exemplification of the principles of the invention and is not intended to limit the invention to the embodiments illustrated. The scope of the invention will be pointed out in the appended claims.

Under normal manufacturing tolerances, the ends of cylinder sleeves in an internal combustion engine are not all exactly in the same plane. Although this variation may normally amounts to only about .005 inch in an in-line, six cylinder engine, such a variation is often as much as 50 percent of the compressibility of the gasket employed with such engines. The variation in compression of the gasket, of course, results in a proportionate variation in the force required to hold the cylinder head down on the cylinder block. As a result, some cylinders tend to be distorted by excessive gasket compression forces.

Since all gaskets currently in use are loaded purely in compression, the gas pressures of combustion act to separate the head and block and reduce the compressive forces acting on the gasket, contributing to leakage tendencies. These and other difficulties have become magnified to critical proportions in modern high output diesel engines. Both temperature and pressure requirements of such engines become so great that soft composite gaskets are quickly burned out. The popular individual solid steel sealing rings require a tremendous cylinder head hold-down force because of their relative incompressibility. Forces of such magnitude cause serious distortion of the cylinder block structure in general and the cylinder surfaces in particular. As a result, modern high output diesel engines are chronically troubled with excessive blow-by and oil consumption during their early life and head gasket failures during later life.

This invention provides a solution to these wide and varied problems. Referring to the drawings, FIG. 1 is a section radially through a typical wet liner type engine, incorporating the invention. The engine comprises a cylinder head 10, a cylinder block 11, and a cylinder liner 12. The engine is provided with a conventional rubber O ring seal 13 for sealing the water transfer passages 14 and 15 in the cylinder head and cylinder block respectively. The cylinder liner is supported by a shoulder 17 which is seated in a counterbore 18 in the top deck of the cylinder block 11. One form of the sealing means of this invention is shown in FIG. 1 and embodies a tapered groove 19 in the flattened end surface of the shoulder 17 of the cylinder liner. The outer surface 19a of the tapered groove is inclined outwardly. A generally rectangular wedge-like sealing ring 20 is provided and has a width less than that of the tapered groove. The outer surface 20a of the sealing ring is tapered at a smaller angle than the adjacent wall 19a of the groove. FIG. 1 shows the assembly of this invention before the cylinder head has been torqued down. It should be noted that the sealing ring is in contact with the cylinder head 10 and the outer wall 19a of the tapered groove liner while the cylinder head is still quite a distance above the cylinder block. This distance represents the range of sealing effectiveness of this ring and shows its relative insensitivity to out of plane variation of the cylinder liner and the length of the cylinder block.

Figure 2:
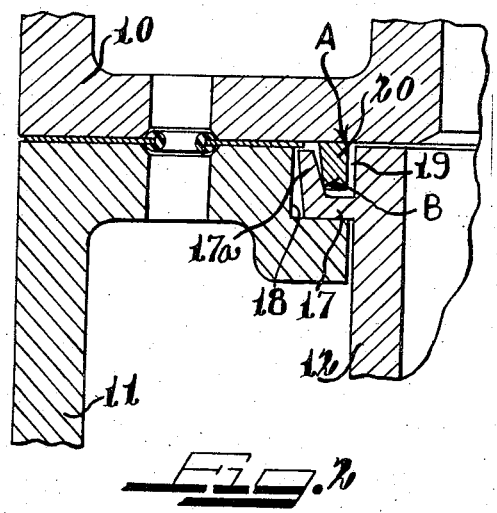
FIG. 2 shows the engine of FIG. 1 wherein the head is torqued down.

FIG. 2 shows the wedge-like tapered sealing ring 20 in proper positioning after the cylinder head has been fully torqued down. The sealing ring has been compressed so that its diameter and circumference have both been appreciably reduced as the sealing ring is forced down into the tapered groove, much the same as a cork is compressed when pushed into the neck of a bottle. It should also be noted that the lip 17a of the shoulder 17 has been expanded slightly as the ring has been circumferentially compressed. This contributes to the dimensional range of effective sealing since deflections of the two members are additive. Such expansion can also be used advantageously to expand the liner 12 solidly into the counterbore 18 to stabilize the liner against piston thrust forces. This, with the differential angle between the adjacent tapered surfaces of the ring 20 and groove 19, causes the ring to twist slightly as it is compressed, thereby developing a line contact at point A and retaining the original line contact at point B. High unit pressure at these points is essential to effective sealing with low compressive force.

The low compressive force required by this invention is accomplished because while the cylinder head exerts a vertical force on the sealing ring, the force it exerts on the liner and cylinder block approaches the horizontal. Further, the adjacent tapered surfaces of the ring and groove multiples the downward force of the cylinder head to accomplish a pressure-tight seal with a small fraction of the compressive load required by conventional gaskets. Not only are the mechanical forces less, but they act on the cylinder liner and cylinder block in the direction in which they are strongest and drastically reduce the tendency to distort the working surface of the cylinder. The compression forces within the sealing ring 20 and the tension forces in the lip 17a, together with the geometry of the parts, comprise a highly elastic sealing system with tremendous ability to conform to and follow up the relative movement of combustion chamber head, cylinder liner and cylinder block caused by thermo, mechanical and dynamic stress. The gas pressures being sealed act to increase the sealing pressure of the ring rather than reduce it as is the case with conventional flat compression gaskets.

The combustion gases within the cylinder of the engine act to increase the sealing pressure of the ring 20. That is, any forces created by the combustion gases will act outwardly against the radially inward face of the ring 20 which will tend to turn the top part of the ring 20 outwardly relative to the lower part. This turning moment will only urge the edge or line A into greater sealing relation with the cylinder head 10 and further prevent escape of gases past the seal or ring 20.

The seal design shown in FIGS. 1 and 2 and as described above, is probably the simplest, most practical application of the basic principle of this sealing concept, but the principle may be applied in a great variety of design variations.

Figure 3:
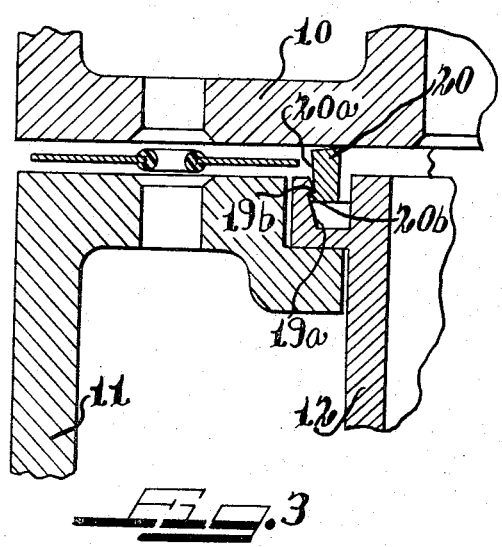
FIG. 3 shows an alternate embodiment of the seal of FIG. 1 wherein the seal is interlocked with the cylinder liner, and shows the parts before the head is torqued down.
Figure 4:
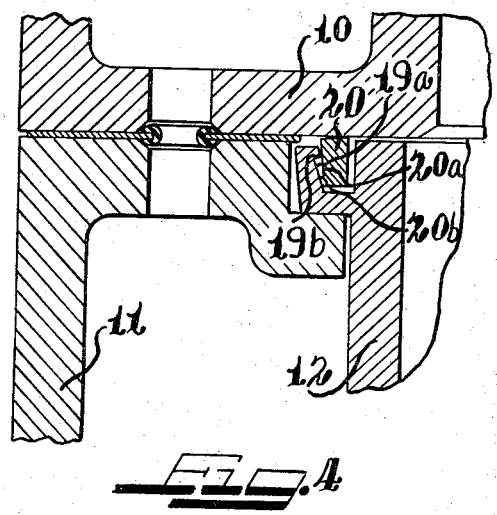
FIG. 4 shows the engine of FIG. 3 wherein the head is torqued down.

FIGS. 3 and 4 show a design in which the sealing ring 20 is interlocked with a cylinder liner 12. The mating tapered surfaces 19a of the groove and 20a of the ring are stepped as at 19b and 20b. The step 20b of the ring is snapped into a partially compressed position below the step 19b of the groove prior to applying pressure by the cylinder head 10. Such a construction results in assembly convenience. In addition, the top surface of the ring can be machined after it is snapped into the groove in the liner to provide for better dimensional tolerance control. Once again the combustion gases in the cylinder wall serve to seal the ring 20 more firmly against the cylinder head 10 to increase the sealing effect of the ring.

Figures 5, 6:
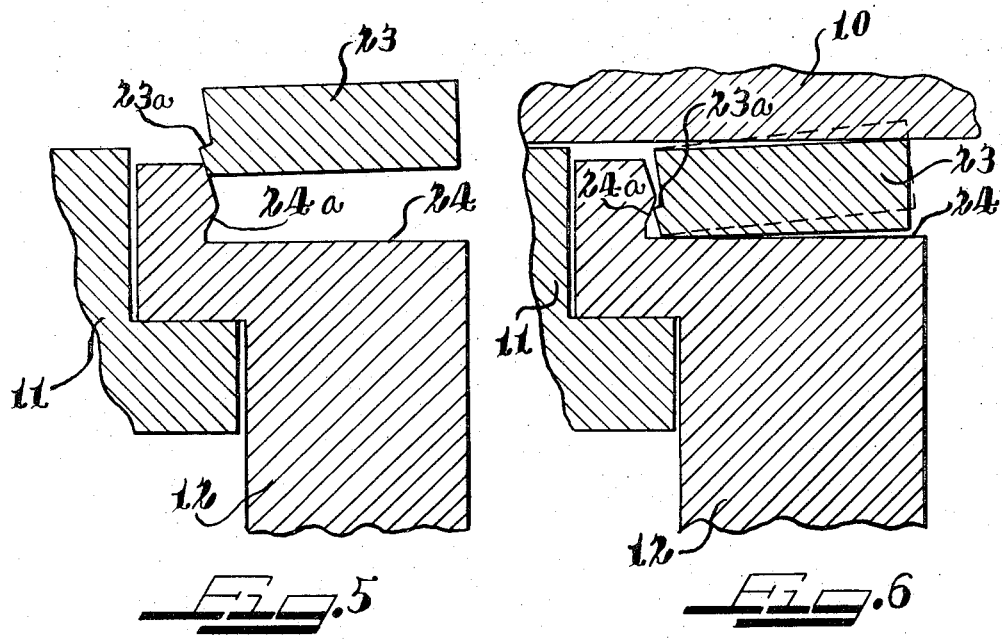
FIG. 5 shows another form of the seal of this invention wherein the seal is separate from the cylinder liner, and shows the parts before the head is torqued down.
FIG. 6 shows the engine of FIG. 5 wherein the head is torqued down.

FIGS. 5 and 6 show a sealing element 23 similar in form and principle to those previously disclosed, but this embodiment may be preferred for an engine having combustion characteristics which would be adversely affected by the volume of the integral groove cut in the shoulder of the cylinder liner. The sealing ring 23 in FIGS. 5 and 6 may also be preferable from the manufacturing standpoint. This form eliminates the internal groove previously shown by providing a separable sealing ring which seats solidly into a counterbore 24 in the top deck of the cylinder liner. The ring interlocks with the cylinder liner the same as the embodiment shown in FIGS. 3 and 4. As seen in FIG. 5, the sealing ring step 23a is in a position to be snapped under the step 24a in the liner. FIG. 6 shows in phantom the attitude of the ring before the head is torqued down. This sealing ring again employs the compression principle of this invention which results in a wide range of compressibility with a very low axial load requirement.

Figures 7, 8:
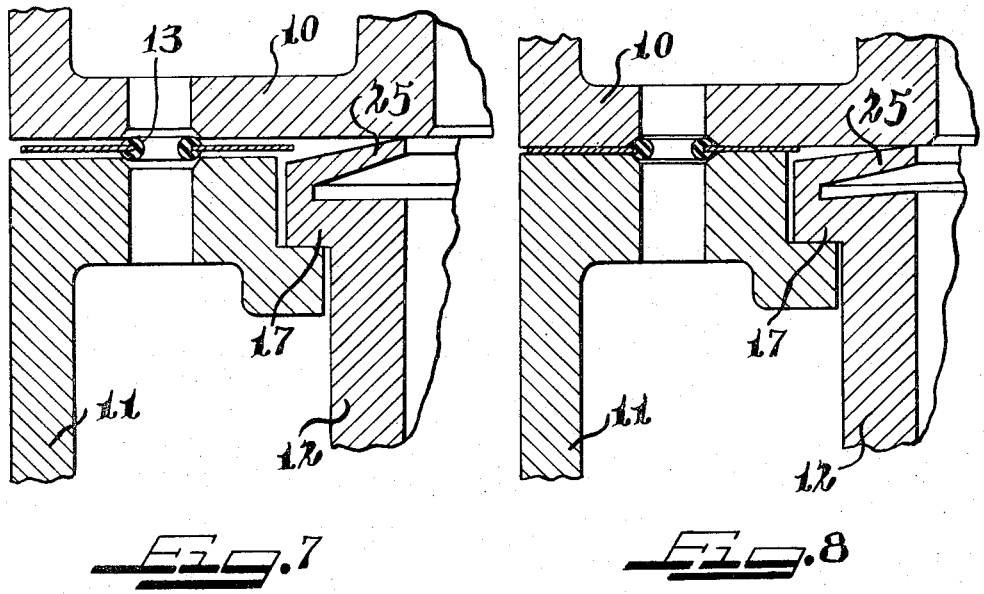
FIGS. 7 and 8 are partial radial sections showing yet another form of the seal of this invention.

FIGS. 7 and 8 show a design in which the endless ring sealing means 25 is machined as an integral part of the cylinder liner's shoulder 17. The liner 12 is shown in FIG. 7 in an unloaded condition where the head 10 is not yet torqued down, whereas FIG. 8 shows the head torqued down with the sealing means 25 in a loaded condition. This type of sealing means has the advantage of being in one piece and is somewhat similar in form to the sealing means of FIGS. 5 and 6 in that it can be so designed as to eliminate the internal groove. It can be almost completely closed when fully compressed to reduce exposure of highly stressed areas to combustion temperatures. Compression of this type of sealing means is less than that of the separate ring type, but this is compensated by the reduction of vertical tolerance stack. Such a construction also has the advantages to be gained by multiplying the downward force of the cylinder head to a force which approaches the horizontal.

FIGS. 9 and 10 show a form of the invention in which a sealing ring 30 is interlocked with a cylinder liner 31 which is to be seated in the engine block 27 against the clamped down cylinder head 28. Specifically, liner 31 has an internal cylindrical surface 32 terminating at a high point or lip 33 with the top axially facing surface or end portion 34 sloping or tapering downwardly and outwardly from the lip 33. An overhanging part 35 has an outwardly facing cylindrical surface 36 lying substantially concentric with surface 32 and extends downward from the edge of the axial surface or end portion 34. An undercut groove 37 is formed between the part 35 and the wall of the liner 31 and has one wall 38 tapered from the mouth 39 of the groove 37 inwardly in converging relation with the other wall 40 of said groove. A sealing ring 42 having an outer wall 43 tapered relative to an inner wall 44 which lies generally parallel to the longitudinal axis of the ring 42 is positioned on the ledge 46 of the cylinder block in position to have the tapered wall 43 in contact with a part of the tapered wall 38 of the groove 37 in the liner. The usual cooling fluid passages 47 and 48 are provided in the cylinder block 27 and cylinder head 28 and are joined by the gasket 49 to provide a fluid tight connection therebetween.

Upon turning the cylinder head 28 down onto the cylinder block 27, the sealing ring 42 will be clamped between the part 35 of the liner and the ledge 46 of the cylinder block as the tapered wall 38 of the part 35 and the tapered wall 43 of the ring slide relative to each other. The ring 42 is contracted and the part is somewhat expanded as the seal between the block and head is completed. FIG. 10 shows the sealed position of the parts with the ring 42 bearing against the ledge 46 and the part 35 bearing against the wall of the block 27 to effect a seal between the fluid passage 47 and the space between the liner, block and head. The lip 33 and end portion 34 of the liner seats against the head to seal off the cylinder from the fluid passages.

FIGS. 11 and 12 show another modification somewhat similar to FIGS. 9 and 10 except that the separate sealing ring is removed and made integral with the cylinder block. Specifically, the cylinder block 27, cylinder head 28, liner 31, part 35, groove 37 and tapered wall 38 are substantially the same as FIGS. 9 and 10. The cylinder block 27 has a ledge 50 surrounding the liner 31 and has a sealing ring 51 integrally formed therewith. From the base 52 of the ring 51 a wall 54 tapers upwardly in a converging relation with a cylindrical wall 55 of said ring. The tapered wall 54 engages with the tapered wall 38 of the liner as shown in FIG. 11. A sealing washer 57 can be placed at the junction of the liner 31 and the block 27.

Upon clamping the head 28 to the block 27, the part 35 of the liner and the ring 51 of the block urge each other together until the position of FIG. 12 is obtained. That is, the ring 51 is contracted and the part 35 slightly expanded as the two tapers are forced together so that a seal is effected between the liner 31 and the block 27. The washer 57 is crushed over the opening between the liner and the block. The lip 33 and end 34 of the liner engage with the head in a sealing relation about the cylinder. The gasket 49 between the passages 47, 48 provides a substantially fluid tight seal between the liner and the head. In this way communication between the passage 47 in the block and the combustion chamber within the liner is substantially eliminated.

Each of the above embodiments shown in the drawings is as equally effective in an engine which employs dry cylinder liners as well as the wet liners shown in the drawings. In addition, while a generally trapezoidal cross sectional wedge ring has been shown in the drawings, the basic concept of this invention can be employed with various geometric cross sections including ones having curved mating faces on the sealing ring and groove.

Thus it can be seen that I have provided a means by which a wedge form of sealing member having a tapered surface can be compressed on pressure contact with a tapered surface in a cylinder liner to translate the vertical axial hold-down force applied by the cylindrical head on the seal into a force acting on the liner which approaches a radial direction. The action of the wedge also results in a sealing element being stressed in compression throughout its entire circumference. The great developed length of the seal member, therefore, results in a high sealing force at low stress of the seal member, thereby insuring the retention of its elastic properties.

I claim:

1. In an engine having a block, at least one tubular cylinder liner seated in said block, a combustion chamber head adapted to be torqued down onto the top of said block over the end of said cylinder liner, the top portion of said cylinder liner having an outwardly extending horizontal offset portion with an axially directed wall extending from said offset portion and spaced radially outwardly from the inner wall of said liner, said axaially directed wall tapered at a slight angle outwardly toward the upper end of said liner, sealing ring means having a generally trapezoidal cross sectional shape and being positioned between said cylinder liner and said combustion chamber head, the top wall and the inside wall of said sealing ring means forming at their intersection a continuous edge, the outer wall of said sealing ring means being tapered downwardly and inwardly at an angle slightly less than said angle of said axially directed wall of said liner, the tapered outer wall and the bottom wall of said sealing means forming at their intersection an outer edge engaging said wall of the liner at an intermediate point thereof, so that as said head is torqued down onto said block, said sealing ring means is engaged in line contact by said head along said continuous edge thereof and said sealing ring means is compressed by the inward pressure created along a continuous line of contact between the tapered wall of the liner and the outer edge of the tapered wall of said sealing ring means, and said sealing ring means has its bottom wall spaced axially from the horizontal offset portion of the liner so that pressure that is built up in the cylinder will act upwardly and outwardly on said sealing ring means to further assist in sealing said ring means to said head and to said liner.

2. A device as claimed in claim 1 wherein said sealing ring means and said liner have coacting means for holding said sealing ring means in operative position on said liner.

3. A seal for sealing an engine block to a combustion chamber head comprising at least one cylinder liner seated in said engine block and having a flattened end wall thereon, an annular groove formed axially in said end wall and having the outside wall of said groove tapered at a slight angle outwardly relative to the vertical axis of said groove, sealing ring means in said groove, said sealing ring means having a top wall and an inside wall forming at their intersection a continuous edge on said sealing ring means, said sealing ring means having a bottom wall and an outer wall tapered downwardly and inwardly at an angle slightly less than the angle of said wall of said liner, the tapered outer wall and the bottom wall of said sealing means forming at their intersection an outer edge engaging said wall of the liner at an intermediate point thereof, so that as said heat is torqued down onto said block, said sealing ring means is engaged in line contact by said head along said continuous edge and is twisted about said continuous edge as said sealing ring means is compressed by the inward pressure created by the tapered wall of the liner engaging the said outer edge of the tapered wall of said sealing ring means, and said sealing ring means bottom wall spaced from the bottom of the groove in the liner so that pressure in the cylinder will act upwardly and outwardly on said sealing ring means to further assist in sealing said ring means to said head and to said liner.

4. In an engine having a block, at least one tubular cylinder liner seated in said block, a combustion chamber head adapted to be torqued down onto the top of said block over the end of said cylinder liner, the top portion of said cylinder liner having a horizontal offset portion with an axially directed wall extending from said offset portion and spaced radially outwardly from the inner wall of said liner, at least a portion of said axially directed wall tapering at a slight angle outwardly toward the upper end of said liner, sealing ring means positioned between said cylinder liner and said combustion chamber head, at least a portion of the outer wall of said sealing ring means being tapered downwardly and inwardly at an angle slightly less than said angle of said axially directed wall of said liner, a lower end of the tapered wall portion of said outer wall of said sealing rings means engaging the axially directed wall of said liner at an intermediate point thereof, so that as said head is torqued down onto said block, said sealing ring means is engaged by said head and is compressed by the inward pressure created along the line contact between the tapered wall of the liner and the edge of the tapered wall of said sealing ring means, and said sealing ring means having its bottom wall spaced from the horizontal offset portion of the liner so that pressure built up in the cylinder will act both upwardly and outwardly on said sealing ring means to further assist in sealing said sealing ring means to said head and to said liner.

5. A device as claimed in claim 4 wherein said sealing ring means and said liner have coacting means for holding said sealing ring means in operative position on said liner.

6. A device as claimed in claim 4 wherein said sealing ring means has a top wall and an inside wall defining a continuous leading edge on said sealing ring means, said leading edge being engaged by said head as said head is torqued down onto said block whereby said sealing ring means is canted, when acted upon by pressure in the cylinder, to create an increased sealing effect between the head and the liner.

References Cited

UNITED STATES PATENTS

| | | | |
|---|---|---|---|
| 2,405,152 | 8/1946 | Kilchenmann | 123—41.83 X |
| 2,477,533 | 7/1949 | Whiting | 277—170 |
| 2,674,988 | 4/1954 | Evans et al. | 92—169 |
| 2,732,809 | 1/1956 | Mattingly et al. | 92—171 X |
| 2,851,020 | 9/1958 | Dolza | 123—41.84 X |
| 2,960,198 | 11/1960 | Keefe | 277—170 X |
| 2,991,092 | 7/1961 | MacKay | 277—170 |

FOREIGN PATENTS

| | | |
|---|---|---|
| 620,617 | 5/1961 | Canada. |
| 1,252,580 | 12/1960 | France. |

MARTIN P. SCHWADRON, *Primary Examiner.*

I. C. COHEN, *Assistant Examiner.*